United States Patent
Henry

(10) Patent No.: US 7,716,397 B2
(45) Date of Patent: May 11, 2010

(54) METHODS AND SYSTEMS FOR INTERPROCESSOR MESSAGE EXCHANGE BETWEEN DEVICES USING ONLY WRITE BUS TRANSACTIONS

(75) Inventor: Russell J. Henry, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 225 days.

(21) Appl. No.: 11/824,946

(22) Filed: Jul. 3, 2007

(65) Prior Publication Data

US 2009/0013113 A1    Jan. 8, 2009

(51) Int. Cl.
  *G06F 3/00* (2006.01)
  *G06F 15/16* (2006.01)
(52) U.S. Cl. .................................. 710/52; 709/237
(58) Field of Classification Search .................... 710/29, 710/39, 52–57, 305, 105; 709/237
  See application file for complete search history.

(56) References Cited

U.S. PATENT DOCUMENTS

| | | | | |
|---|---|---|---|---|
| 4,449,182 A * | 5/1984 | Rubinson et al. | ............... | 710/60 |
| 5,142,683 A * | 8/1992 | Burkhardt et al. | ........... | 709/215 |
| 5,412,803 A * | 5/1995 | Bartow et al. | ............... | 709/213 |
| 5,734,924 A * | 3/1998 | Cheng et al. | ................... | 710/4 |
| 5,841,973 A * | 11/1998 | Kessler et al. | ............... | 709/250 |
| 5,892,969 A * | 4/1999 | Young | ........................... | 710/5 |
| 5,905,905 A * | 5/1999 | Dailey et al. | ................... | 710/5 |
| 5,968,143 A * | 10/1999 | Chisholm et al. | ............. | 710/23 |
| 5,983,292 A * | 11/1999 | Nordstrom et al. | ........... | 710/54 |
| 6,085,277 A * | 7/2000 | Nordstrom et al. | .......... | 710/263 |
| 6,138,176 A * | 10/2000 | McDonald et al. | ............. | 710/6 |
| 6,434,630 B1 * | 8/2002 | Micalizzi et al. | ............... | 710/5 |
| 6,564,271 B2 * | 5/2003 | Micalizzi et al. | ............. | 710/39 |
| 6,601,089 B1 * | 7/2003 | Sistare et al. | ............... | 709/213 |
| 6,810,440 B2 * | 10/2004 | Micalizzi et al. | ............. | 710/19 |
| 6,829,660 B2 * | 12/2004 | Liu et al. | ...................... | 710/22 |
| 7,171,509 B2 * | 1/2007 | Cassidy | ...................... | 710/308 |

* cited by examiner

*Primary Examiner*—Mark Rinehart
*Assistant Examiner*—Trisha Vu
(74) *Attorney, Agent, or Firm*—Duft Bornsen & Fishman LLP

(57) ABSTRACT

Systems and methods for reducing or eliminating use of read transactions by a message consuming device coupled through a shared bus to a message producing device to transfer a message from the producing device to the consuming device. Features and aspects hereof provide for use of only write transactions on the bus issued by the devices to transfer messages directly into the data memory of the consuming device. A memory manager on the producing device may manage allocation and freeing of buffer space within the data memory of the consuming device. The producing device notifies the consuming device when a message transfer is completed.

3 Claims, 7 Drawing Sheets

METHODS AND SYSTEMS FOR INTERPROCESSOR MESSAGE EXCHANGE BETWEEN DEVICES USING ONLY WRITE BUS TRANSACTIONS

BACKGROUND

1. Field of the Invention

The invention relates generally to interprocessor message exchange between devices attached through a bus and more specifically relates to methods and systems for performing such message exchange between a data consuming device and a data producing device coupled by a bus utilizing only write transactions on the bus (e.g., without issuing read transactions by either the consuming device or the producing device for such message exchanges).

2. Discussion of Related Art

In electronics and computing systems, devices are typically coupled to one another through shared bus structures. The peripheral component interconnect (PCI) bus standards have become a popular choice for designing of such interconnecting us structures. Other well-known, commercially available bus structures are also popular such as the AMBA AHB bus structure and numerous other well-known bus structures.

Many applications couple processors through such a shared bus structure such that the processors exchange messages to coordinate their respective operations. For example, some peripheral controller devices now incorporate multiple processors coupled to one another through a bus and adapted to exchange messages using low level bus transactions. Such systems help reduce the overhead processing associated with higher level data exchanges through more complex protocols. A first processor may perform, for example, processing related to control of the peripheral device while a second processor may provide higher level application functions for interfacing to external systems attached to the multi-processor controller system.

In such applications, the producer device (e.g., a first processor) may transfer a message to the consumer device (e.g., a second processor) through the interconnecting bus structure. In general, such bus structures may provide for low level read transactions as well as low level write transactions. The producing device typically requires information from the consuming device identifying a location in which the message to be transferred may be stored in the data memory of the consuming device. In the PCI bus structure as in most such bus structures, a device requiring information may request retrieval of such information from the other device using a read transaction and then await the return of the requested information in a read response transaction from the other device. As generally practiced in the art at present, a message consuming device may provide information to a message producing device through the shared bus structure. The read transaction from the message producing device requests an address in the data memory of the message consuming device for storing the message to be transferred. The read transaction is then completed by a subsequent read response transaction on the same bus to provide the requested information to allow a message transfer from the producing device to the consuming device.

In general, as presently practiced in the art, the processing of a read transaction and a corresponding subsequent read response transaction over the bus may cause the consuming device to experience idle periods of processing where the devices are, for practical purposes, "tied up" between the initiation of the read transaction and the eventual read response transaction to get the required address for transfer of the message. Though such idle time is not required by the PCI bus specifications nor most other standardized bus structures, the typical structure of present day bus interface circuit designs as applied to interprocessor message exchange between a consuming and producing device over the particular bus typically imposes such idle periods of processing. By contrast, most present day interprocessor message exchange designs tend to indicate immediate completion of a write transaction for transfer of data between a producing device and a consuming device. Therefore, read transaction processing on a typical bus is more costly than write transaction processing as measured by the degree of utilization of the processor for the devices involved in the message exchange.

It is evident from the above discussion that an ongoing need exists for improving processor utilization in the processing of message exchanges between producing and consuming devices coupled through shared bus structure.

SUMMARY

The present invention solves the above and other problems, thereby advancing the state of the useful arts, by providing methods and systems to exchange messages between a message consuming device and a message producing device by utilizing write transactions instead of read transactions The improved methods and systems utilized only write transactions to retrieve identified data of a message thereby improving utilization of the processors of the devices by avoiding costly processing for read transactions.

DETAILED DESCRIPTION OF THE DRAWINGS

Figure 1:
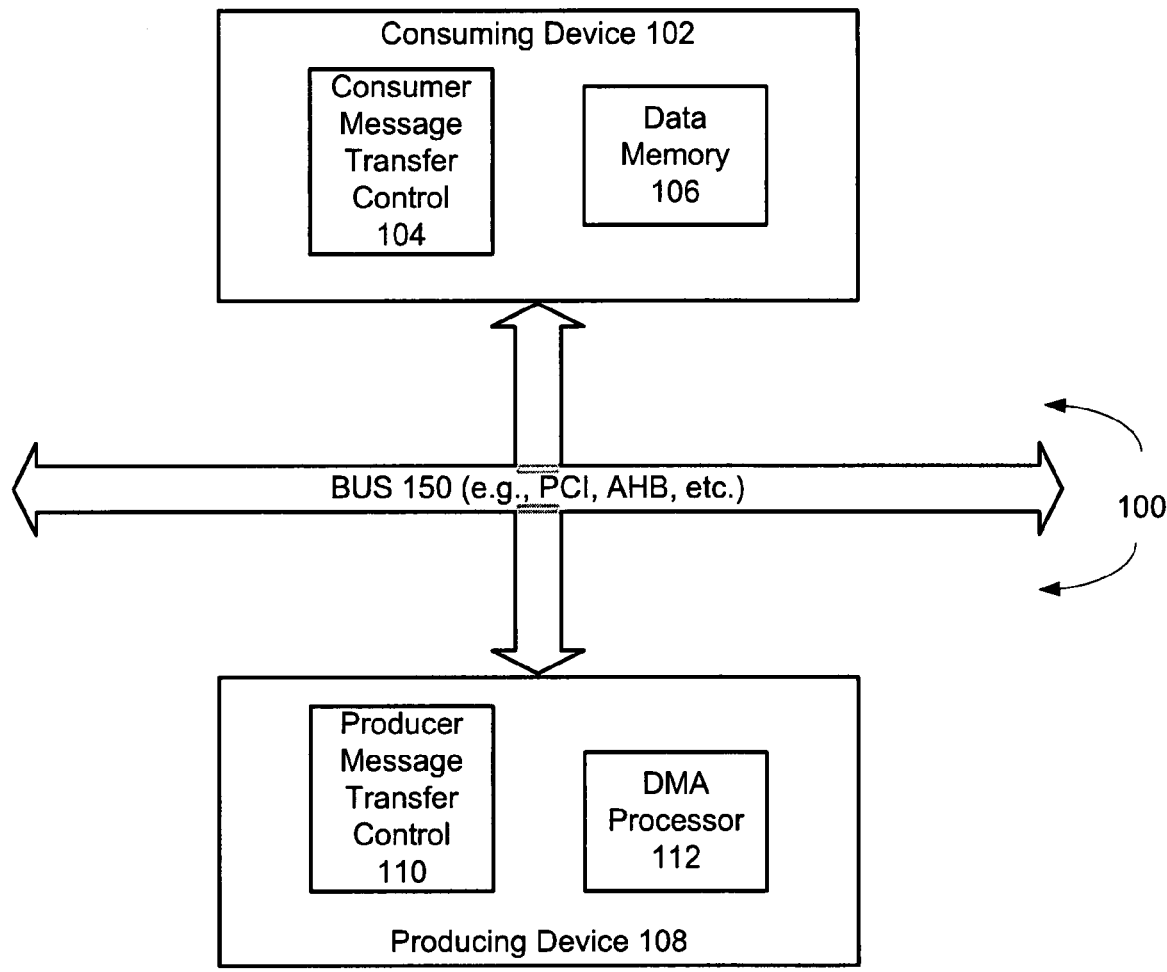
FIG. 1 is a block diagram of a typical message exchange structure between two device coupled to a shared bus as presently practiced in the art.

FIG. 1 is a block diagram of a system 100 as presently known in which read transactions may be involved in messages transferred from the producing device 108 to the consuming device 102 via a shared bus structure 150. For example, the producing device 108 may issue a read transaction to the consuming device 102 to determine a location in data memory 106 into which a message may be stored. As noted above, processing of read transactions can impose burdensome overhead processing (e.g., dead or idle processing time) on the devices in that an initial read transaction to retrieve the location in data memory 106 for storing a message may suspend processing of the devices until the ultimate read response transaction is provided to complete the read transaction. In particular, producer message transfer control 110 may first issue a read transaction to the consumer message transfer control 104 requesting an address in data memory 106 for storage of a message to be transferred from the producing device 108. The consuming device 102 may retain management information regarding available storage for messages in its data memory 106. A read response transaction is then issued from the consumer message transfer control 104 to the producer message transfer control 110 supplying the address of an available location in the data memory 106. Using that memory address in data memory 106, element 110 (producer) may then issue a write transaction to transfer the message using DMA 112 into the indicated address of data memory 106.

The messages to be exchanged may be any message useful to cooperation of the two processing devices—i.e., the consuming device 102 and the producing device 108. For example, the two processing devices may exchange messages relating to cache management, relating to block or file I/O processing, etc. More generally, the messages exchanged may relate to any information defined, for example in the Common Information Model (CIM) well known to those of ordinary skill in the art. CIM defines a number of standard types of information that may be shared and exchanged between cooperating processing devices.

By contrast, features and aspects hereof provide for exchange of messages without need for any read transactions between the devices. Though presented primarily with regard to PCI and/or AMBA AHB bus structures, features and aspects hereof may be usefully applied to any interconnecting bus structure between cooperating devices where a write transaction is more efficient than read transaction processing. Transaction types such as "read", "read response", and "write" have essentially equivalent transaction types in other well known bus structures and protocols. Numerous other commercially available bus structures will be readily apparent to those of ordinary skill in the art where features and aspects hereof may be usefully applied.

Figure 2:
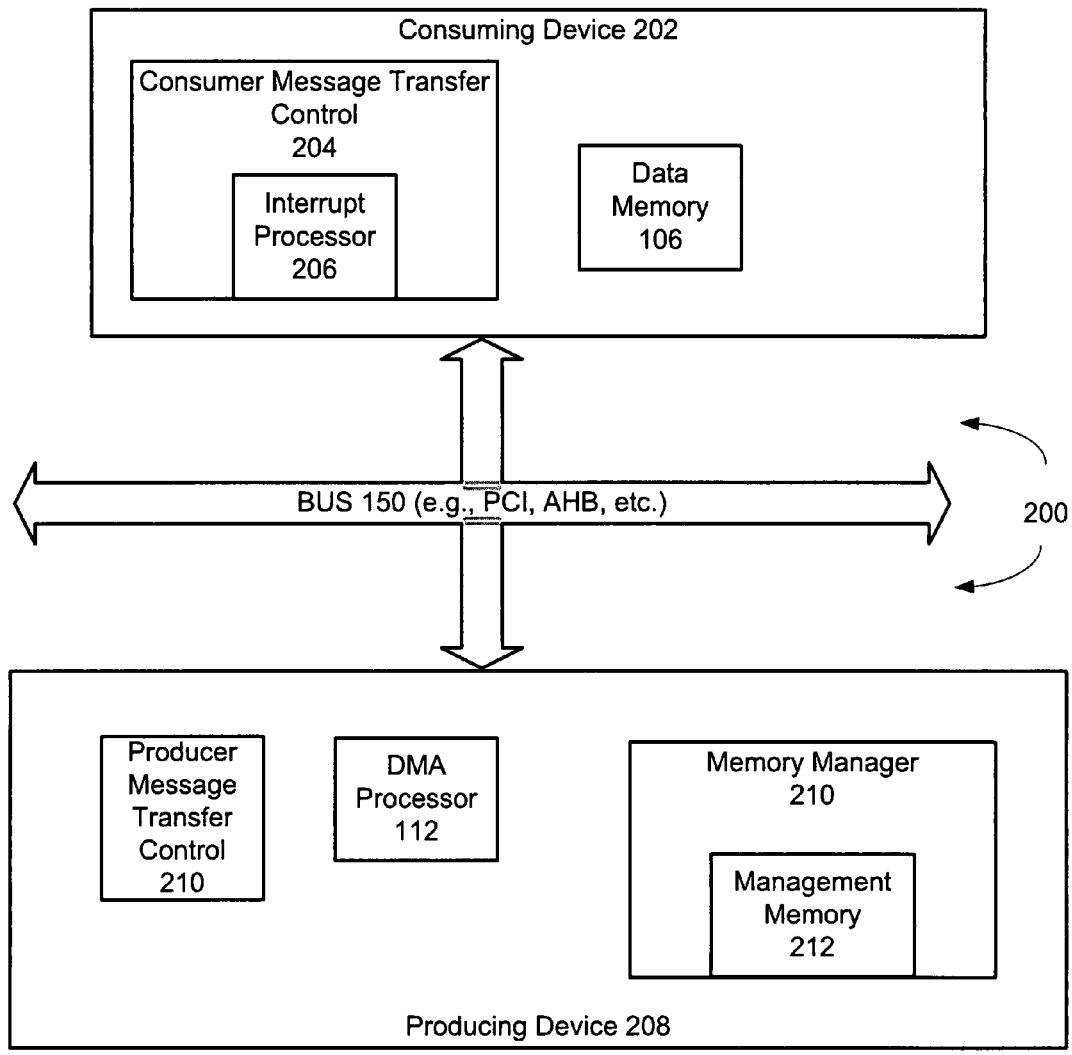
FIGS. 2-3 are block diagrams of exemplary systems providing: a data consuming device, a data producing device, and an interconnecting shared bus structure wherein the systems are enhanced in accordance with features and aspects hereof to reduce utilization of read transactions for message exchange between the devices.

FIG. 2 is a block diagram of a system 200 enhanced in accordance with features and aspects hereof to reduce utilization of read transactions between a message consuming device and a message producing device. As in FIG. 1, bus 150 couples message consuming device 202 to message producing device 208 for purposes of transferring a message to consuming device 202 from producing device 208. Consumer message transfer control 204 adapted to send a single, initial write transaction to producing device 208 indicating the entire extent of data memory 106 available for use to receive messages from producing device 208. This initial write transaction may be performed at initialization or at other reset conditions of consuming device 202. Memory manager 210 within producing device 208 processes this initial information by generating appropriate memory management data structures within management memory 212 of memory manager 210. Utilizing appropriate data structures, memory manager 210 manages the allocation and freeing of buffers in data memory 106 of consuming device 202.

When producing device 208 has a message to be sent to consuming device 202, producer message transfer control 210 interacts with memory manager 210 to allocate sufficient buffer space in data memory 106 of consuming device 202. Appropriate memory management data structures are generated and manipulated in management memory 212 by operation of memory manager 210 to account for the allocation of the buffer space and to associate the allocation with the corresponding message to be transferred. Having allocated appropriate buffer space in data memory 106, producer message transfer control 210 of producing device 208 transfers its message to consuming device 202 using DMA processor 112 to transfer the message into data memory 106 of consuming device 202 in the buffer space allocated by operation of memory manager 210.

Upon completion of the transfer, producing device 208 (e.g., producer message transfer control 210 and/or DMA processor 112) signals consuming device 202 that the message transfer has been completed. Such a signal may preferably generate an interrupt in consuming device 202 fielded and processed by interrupt processor 206. Responsive to such an interrupt signal received via bus 150, consuming device 202 then consumes the data transferred by producing device 208 into allocated buffer space of its data memory 106. Upon completion of consumption or utilization of the new message consuming device 202 may signal memory manager 210 of producing device 208 via bus 150 that the allocated buffer space is again free for potential reuse. Again, a write transaction may be employed by consuming device 202 (e.g., by consumer message transfer control 204) to so signal the memory manager 210 of the producing device 208 that the buffer is again free for reuse. Responsive to such a completion signal, memory manager 210 manipulates appropriate data structures in management memory 212 to indicate that the previously allocated buffer space is again available for reuse. In particular, memory management 210 may be operable to coalesce smaller portions of the free space in data memory 106 into larger available spaces. Operations of memory manager 210 are generally well known to those of ordinary skill in the art for purposes of managing available space in data memory 106 by use of appropriate data structures in management memory 212. Any suitable memory manager techniques and processing elements may be employed by memory manager 210 as well known to those of ordinary skill in the art.

Figure 3:
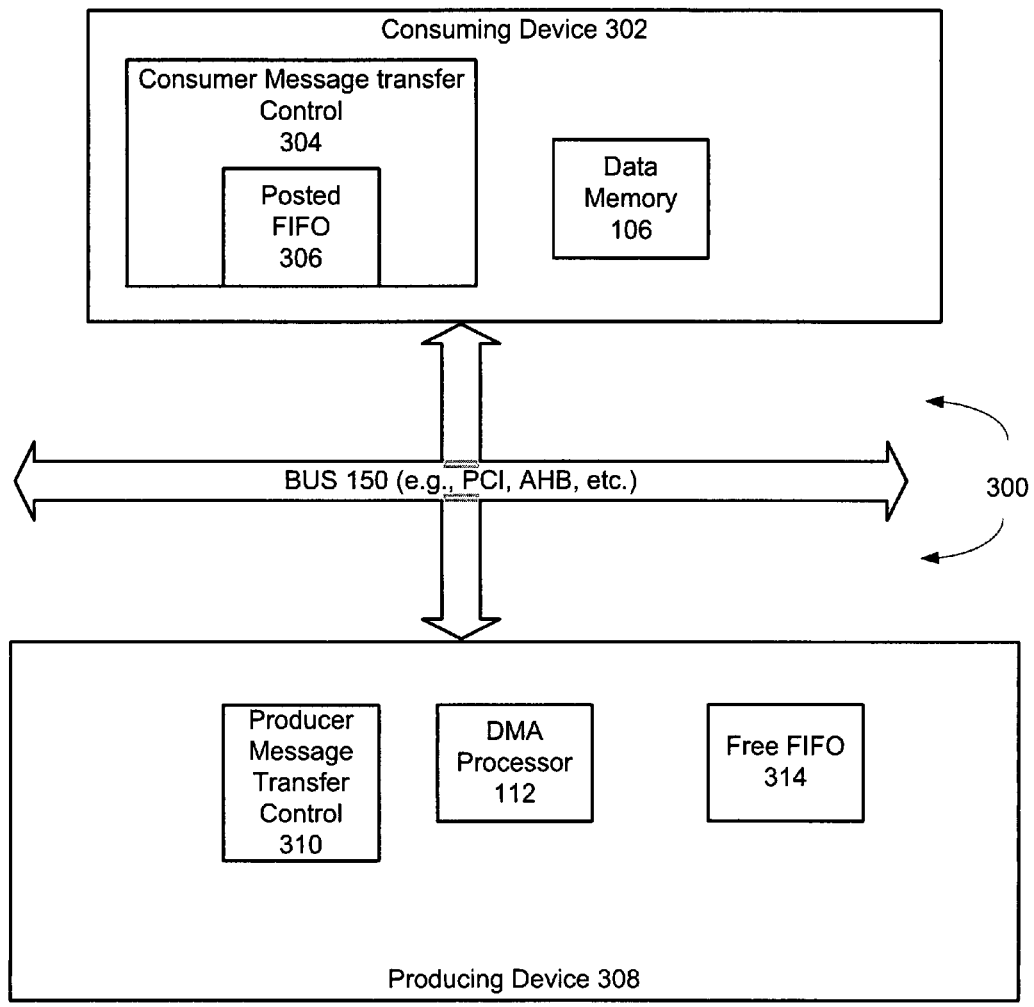

FIG. 3 is a block diagram of a system 300 adapted in accordance with features and aspects hereof to reduce utilization of read transactions for purposes of transferring messages from producing device 308 to consuming device of 302. System 300 of FIG. 3 utilizes write transactions to exchange information between consuming device 302 and producing device 308 for purposes of exchanging messages. In particular, consumer message transfer control 304 of consuming device 302 first records in free FIFO 314 of producing device 308 a desired buffer space location in data memory 106 into which producing device 308 may store a next message. When producing device 308 needs to transfer a message to consuming device 302, producer message transfer control 310 of producing device 308 retrieves a next free buffer address from free FIFO 314 and utilizes DMA processor 112 to store the message into the buffer space of data memory 106 identified by the address information retrieved from free FIFO 314. Upon completion of the transfer of the message, producing device 308 (e.g., producer message transfer control 310 and/or DMA processor 112) issues a write transaction to posted FIFO 306 of the consuming device 302 storing the address of the buffer space in data memory 106 into which the message was stored. In addition, producing device 308 clears the entry in free FIFO 314 indicating the address to which the message was stored. Lastly, consuming device 302, responsive to the newly posted entry in posted FIFO 306, processes the message in the indicated buffer space of data memory 106. Upon completion of the processing or consumption of the message, consumer message transfer control 304 removes the entry in posted FIFO 306 indicating the address of the now consumed message in data memory 106. Lastly, control 304 may issue a write transaction to place the address of the consumed message back into the free FIFO 314 of the producing device 308.

Those of ordinary skill in the art will further recognize numerous additional and equivalent elements useful in systems 200 and 300 of FIGS. 2 and 3, respectively, for fully functional operation of the methods. Such additional and equivalent elements are well known to those of ordinary skill in the art and omitted from FIGS. 2 and 3 for simplicity and brevity of the above discussion. Therefore, FIGS. 2 and 3 are intended to suggest exemplary embodiments only relating to features and aspects hereof for utilization of only write transactions for transferring a message to a consuming device from a producing device through an intermediate bus structure.

Figure 4:
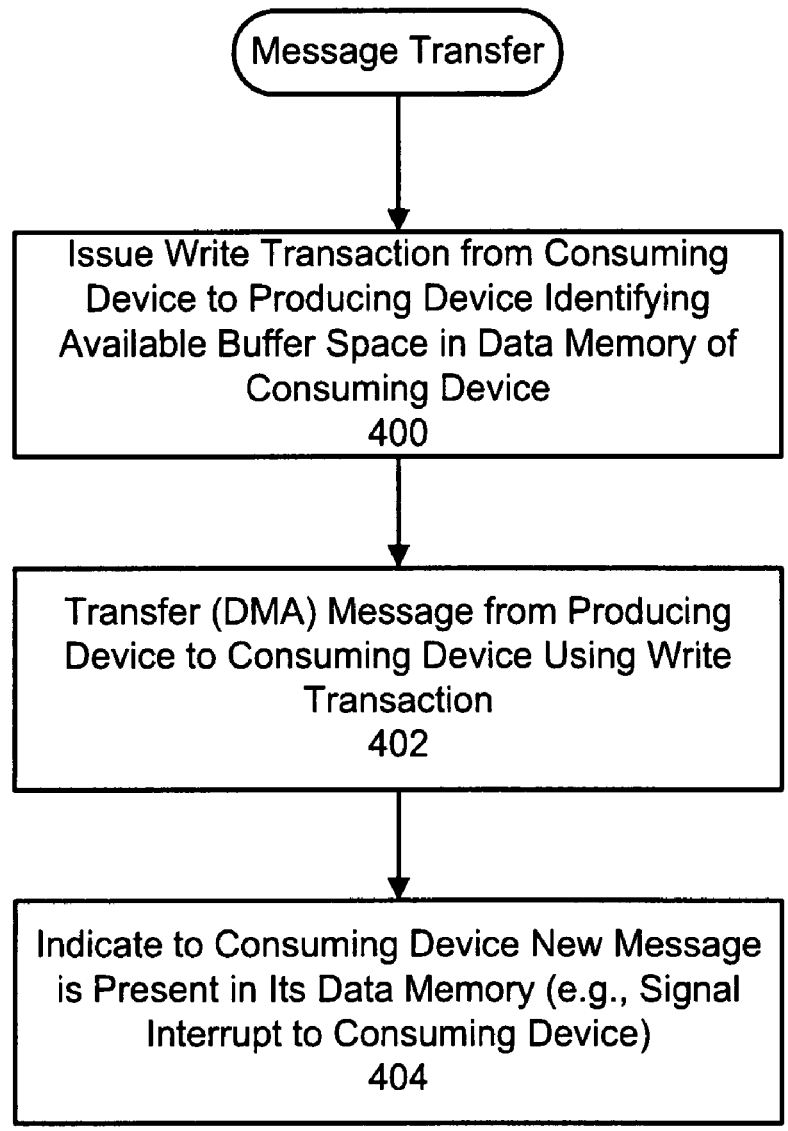
FIGS. 4-6 are flowcharts depicting exemplary methods operable in systems providing a consuming device of data, a producing device of data, and an interconnecting shared bus structure wherein the methods are enhanced in accordance with features and aspects hereof to reduce utilization of read transactions for exchange of data between the devices.

FIG. 4 is a flowchart describing an exemplary method in accordance with features and aspects hereof operable within systems such as those described in FIGS. 2 and 3 above. In general, the method of FIG. 4 provides for utilizing only write transactions for transfer of a message from a message producing device to a message consuming device. The consuming device may issue a write transaction to the producing device to identify buffer space in the data memory of the consuming device for storage of a next message. The producing device may then respond by transferring the new message and storing it directly in the data memory of the consuming device in the indicated available location.

In particular, element 400 of FIG. 4 is first operable to issue a write transaction from the consuming device to the producing device. The write transaction identifies a location in the data memory of the consuming device's data memory in which a next message may be stored. Element 402 then represents operations in the producing device to transfer the next message from the producing device to the consuming device. Preferably such transfer may be performed utilizing well-known DMA techniques and circuits through the bus structure coupling the consuming device and producing device. When the transfer of the message has completed, element 404 is next operable within the producing device to indicate to the consuming device that the new message is present in the data memory of the consuming device. For example, an interrupt signal or other appropriate electronic signal may be applied through the bus connecting the consuming device and producing device. Thus the producing device may cause an interrupt in the consuming device to notify the consuming device of the presence of a new message to be consumed. The consuming device may then utilize or consume in whatever manner is appropriate the new message from its local data memory.

Figure 5:
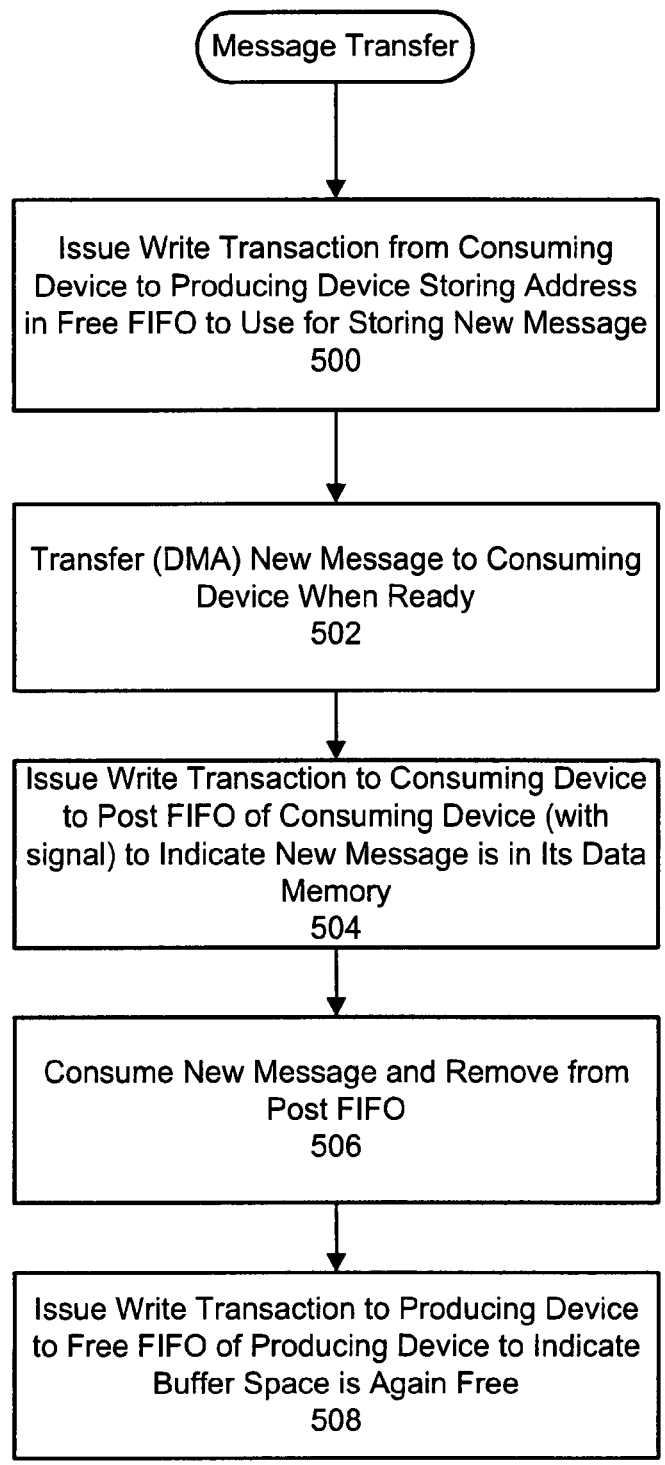

FIG. 5 is a flowchart describing another exemplary method in accordance with features and aspects hereof operable within systems such as those described in FIGS. 2 and 3 above. Element 500 is first operable to issue a write transaction from the consuming device to the producing device indicating allocated free space in the data memory of the consuming device for use by the producing device to store a new message. When the producing device has a new message to be sent to the consuming device, the producing device transfers at element 502 (preferably utilizing DMA techniques and circuits) the new message from the producing device to the consuming device. When the message transfer to the data memory of the consuming device has been completed by the producing device, the producing device is next operable at element 504 to post completion information (e.g., in a post FIFO of the consuming device) to indicate to the consuming device that a new message is present in its allocated portion of data memory. This posting may also include a signal as discussed above to interrupt processing of the consuming device to indicate a new message is available as indicated in the post FIFO. At element 506, the consuming device consumes (processes) the newly stored message as indicated in the post FIFO. In addition, the entry in the post FIFO is cleared and at element 508, the consuming device uses a write transaction to store the now freed buffer location back in the free FIFO of the producing device.

Figure 6:
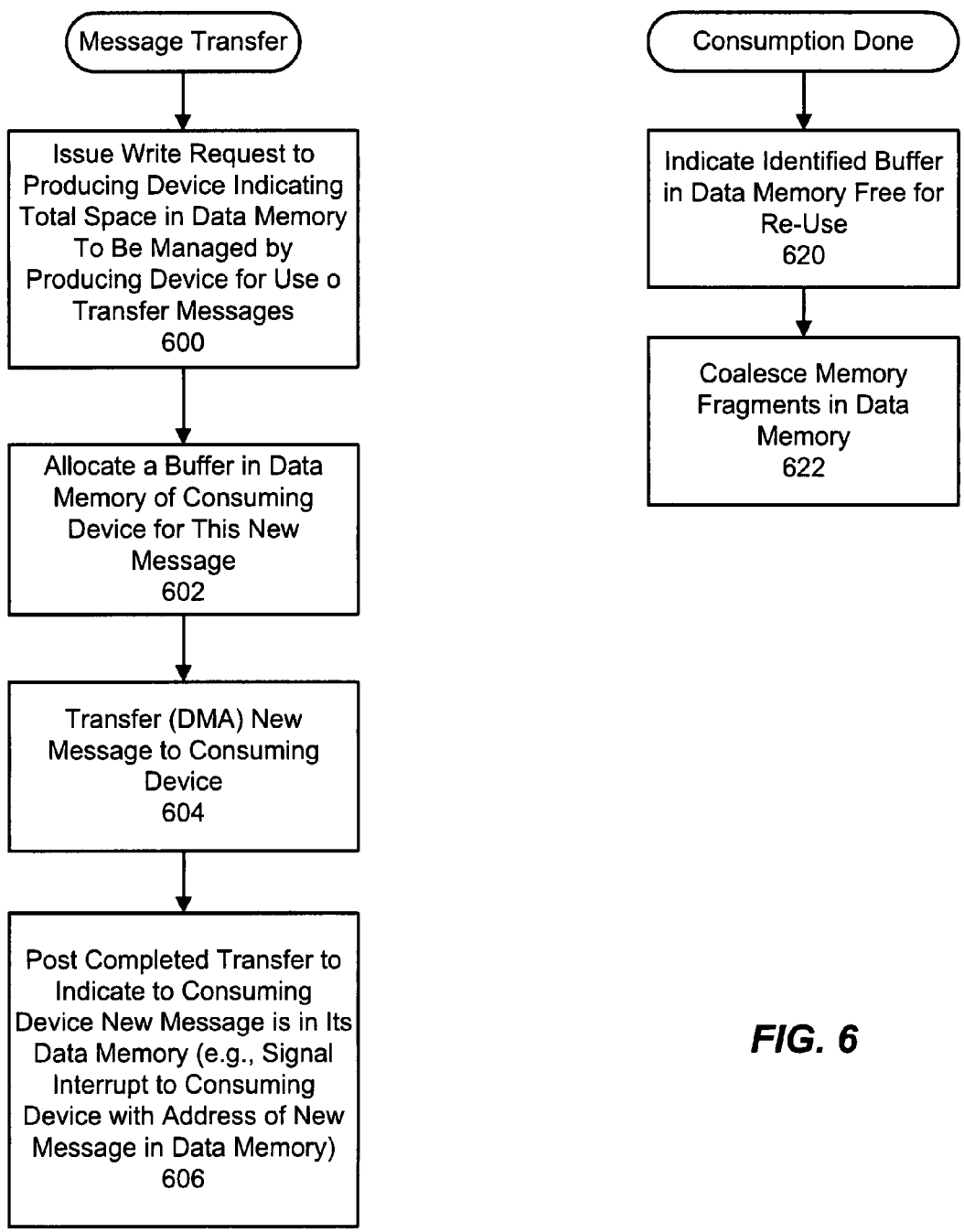

FIG. 6 is a flowchart of yet another embodiment of a method in accordance with features and aspects hereof to reduce or eliminate utilization of read transactions for purposes of transferring messages from a message producing device to a message consuming device. Rather, similar to the methods described above with respect to FIGS. 4 and 5, the method of FIG. 6 utilizes write transactions to effectuate the transfer of messages from a producing device to a consuming device. The method of FIG. 6 may be operable within systems such as those described in FIGS. 2 and 3 above. In particular, the method of FIG. 6 is preferably operable in a system such as shown in FIG. 2 above where a memory manager element is operable within the producing device to locally manage all allocation and freeing of buffer space within the data memory of the consuming device.

Element 600 is first operable to issue a write transaction from the consuming device directed to the producing device indicating the total available space in the data memory to be managed by the producing device. This initial write may be performed upon initialization or reset of the consuming device or at any suitable time to restart or reset the processing of memory manager in the producing device. Element 602 then represents processing of the memory manager within the producing device to allocate appropriate buffer space within the data memory of the consuming device for transfer of a new message to the consuming device. Element 604 is then operable to transfer the new message from the producing device to the consuming device. As above, the transfer may preferably utilize well known but the DMA techniques and circuits. Element 606 is then operable within the producing device to post completed transfer information indicating to the consuming device that a new message is now available in the data memory of the consuming device. The posting may include, for example, the application of an interrupt signal to the consuming device and/or return of the address of the new message in the data memory (e.g., the address of the buffer space allocated by the producing device by operation of element 602 above).

Eventually the consuming device will utilize and hence consume the new message from the data memory. Element 620 therefore represents processing within the consuming device to indicate that the identified buffer containing the now consumed message may be freed for reuse by the memory manager of the producing device. Element 622 then represents typical memory management functionality within the memory manager of the producing device to coalesce smaller fragments of memory in the consuming device's data memory to produce larger portions of memory for reuse and subsequent message transfers.

Those of ordinary skill in the art will readily recognize numerous additional and equivalent method steps to those described above with regard to FIGS. 4 through 6. Numerous additional detailed processing steps are omitted from the methods of FIGS. 4 through 6 for simplicity and brevity of this discussion.

Figure 7:
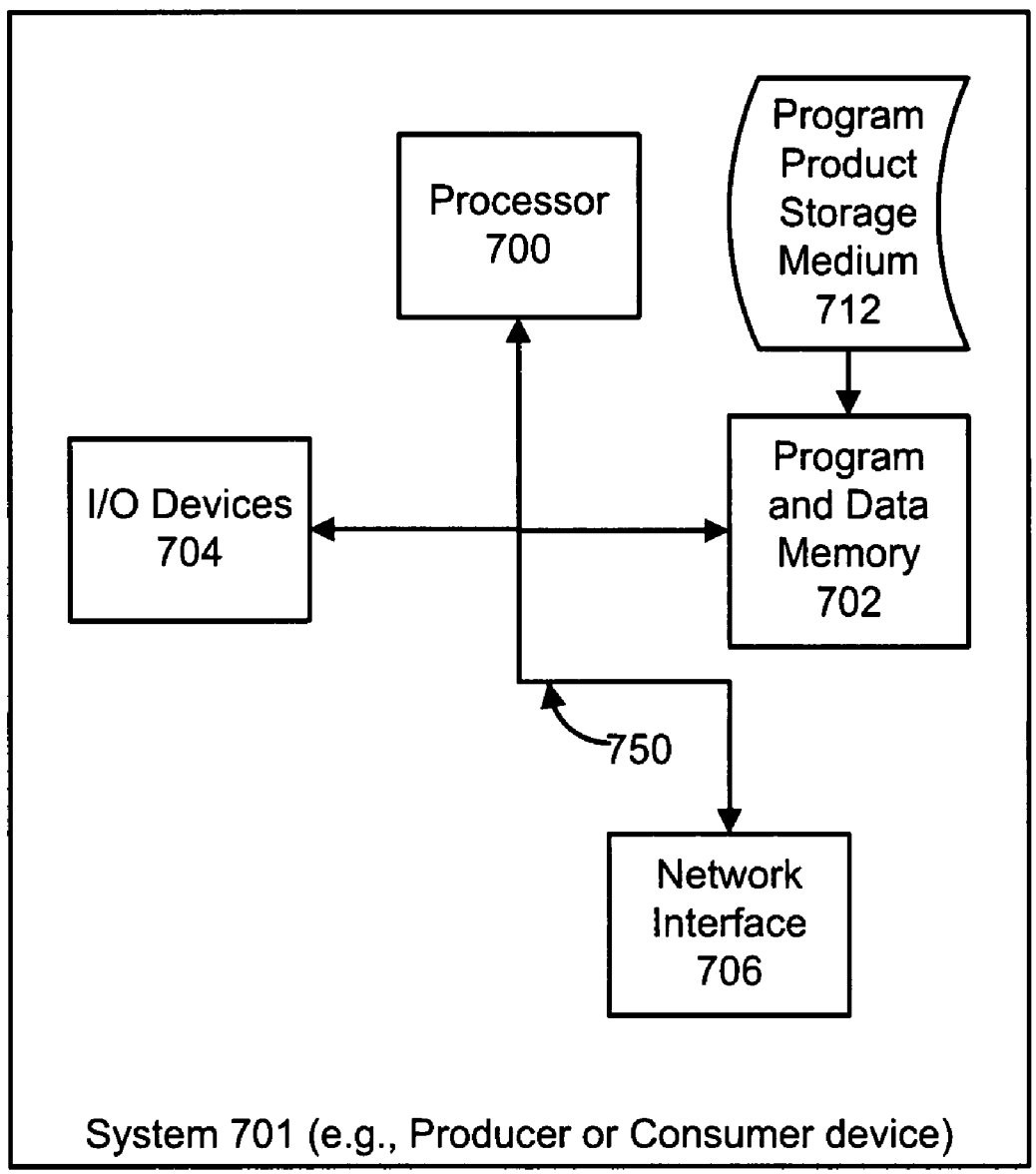
FIG. 7 is a block diagram of an exemplary system/device (a producer and/or a consumer) that may provide enhanced processing features and aspects hereof, the system including bulk storage of a program product that may embody methods and processes hereof.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 7 is a block diagram depicting a print system 701 as a data processing device adapted to provide features and aspects hereof by executing programmed instructions and accessing data stored on a computer readable storage medium 712.

Furthermore, the invention can take the form of a computer program product accessible from a computer-usable or computer readable medium 712 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 700 coupled directly or indirectly to memory elements 702 through a system bus 750. The memory elements can include local memory employed during actual execution of the program code, bulk storage, and cache memories which provide temporary storage of at least some program code in order to reduce the number of times code must be retrieved from bulk storage during execution.

Input/output or I/O devices 704 (including but not limited to keyboards, displays, pointing devices, etc.) can be coupled to the system either directly or through intervening I/O controllers. Network adapter interfaces 706 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A system comprising:
   a bus;
   a consuming device coupled to the bus adapted to receive and consume messages produced by another device;
   a data memory within the consuming device for storing said messages produced by another device to be consumed by the consuming device; and
   a producing device coupled to the bus and adapted to store messages in the data memory for consumption by the consuming device,
   wherein the consuming device signals the producing device when the message has been consumed, and
   wherein the producing device issues only write transactions and interrupt signals on the bus to transfer messages from the producing device to the consuming device, and
   wherein the consuming device issues a write transactions to signal that the transferred message has been consumed, and wherein the producing device further comprises: a management memory within the producing device for storing information regarding the total available space in said data memory of the consuming device, wherein the consuming device issues a write transaction to the producing device via the bus to store information in said management memory regarding the total available space in said data memory, wherein the producing device stores a message in said data memory for use by the consuming device, and wherein the producing device applies an interrupt signal to the consuming device via the bus to indicate to the consuming device that said message is available in said data memory.

2. In a system having a consuming device coupled to a producing device via a bus, a method for transferring a message from the producing device to the consuming device the method comprising:
   issuing a write transaction from the consuming device to the producing device via the bus to store information in a management memory within the producing device regarding total available space in a data memory of the consuming device for storing a message to be transferred from the producing device; wherein the producing device issues only write transactions and interrupt signals on the bus to transfer messages from the producing device to the consuming device;
   transferring a message from the producing device to said data memory of the consuming device by a write transaction issued by the producing device; and
   indicating to the consuming device by the producing device that said message is ready for use by the consuming device,
   wherein the step of indicating further comprises applying a signal from the producing device to the consuming device via the bus to generate an interrupt on the consuming device indicating presence of said message in the data memory.

3. A computer program product comprising a computer readable medium physically embodying a computer readable program, wherein the computer readable program when executed on a system including a consumer and producer device coupled by a shared bus structure causes the system to perform the steps of:
   issuing a write transaction from the consuming device to the producing device via the bus to store information in a management memory within the producing device regarding total available space in a data memory of the consuming device for storing a message to be transferred from the producing device; wherein the producing device issues only write transactions and interrupt signals on the bus to transfer messages from the producing device to the consuming device;
   transferring a message from the producing device to said data memory of the consuming device by a write transaction issued by the producing device; and
   indicating to the consuming device by the producing device that said message is ready for use by the consuming device,
   wherein the step of indicating further comprises applying a signal from the producing device to the consuming device via the bus to generate an interrupt on the consuming device indicating presence of said message in the data memory.

* * * * *